US008840268B2

(12) United States Patent  (10) Patent No.: US 8,840,268 B2
Datz et al.  (45) Date of Patent: Sep. 23, 2014

(54) MULTICOLOR LED BEACON

(75) Inventors: R. Michael Datz, Rochester, NY (US); Stephen T. Vukosic, West Henrietta, NY (US); Andrew Mack, Livonia, NY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 17 days.

(21) Appl. No.: 13/354,316

(22) Filed: Jan. 19, 2012

(65) Prior Publication Data

US 2012/0182730 A1     Jul. 19, 2012

Related U.S. Application Data

(63) Continuation-in-part of application No. 12/806,284, filed on Aug. 9, 2010, now Pat. No. 8,662,702.

(60) Provisional application No. 61/276,115, filed on Sep. 8, 2009.

(51) Int. Cl.
    *F21V 5/00*  (2006.01)

(52) U.S. Cl.
    USPC ........... 362/235; 362/800; 362/244; 362/240; 362/237

(58) Field of Classification Search
    USPC ................. 362/235, 800, 238, 230–232, 341, 362/311.02; 313/113, 512
    See application file for complete search history.

(56) References Cited

U.S. PATENT DOCUMENTS

| | | | |
|---|---|---|---|
| 3,221,162 A | 11/1965 | Heenan et al. | |
| 5,237,490 A | 8/1993 | Ferng | |
| 5,860,726 A | 1/1999 | Richardson | |
| 6,425,678 B1 | 7/2002 | Verdes et al. | |
| 6,483,439 B1 | 11/2002 | Vukosic | |
| 6,626,557 B1 | 9/2003 | Taylor | |
| 7,252,405 B2 | 8/2007 | Trenchard et al. | |
| 7,534,009 B2 | 5/2009 | Trojanowski et al. | |
| 2006/0181879 A1* | 8/2006 | Pederson | 362/341 |
| 2008/0036972 A1* | 2/2008 | Phillips et al. | 353/31 |
| 2008/0048553 A1* | 2/2008 | Destain et al. | 313/499 |

* cited by examiner

*Primary Examiner* — Joseph L Williams
(74) *Attorney, Agent, or Firm* — Kenneth J. Lukacher Law Group

(57) ABSTRACT

An LED beacon has a plurality of LEDs for emitting light of the same or different colors mounting along an upright member within an optical system. To provide a beacon illuminating selectively in one or more colors, the plurality of LEDs are in different groups of two or more LEDs, at least one LED in each group being of a different color. Each group of LEDs are mounted together circumferentially spaced from each other around a central axis. Each of the LEDs when activated projects light there from through the optical system provided by a collimating lens and a condensing, coupling lens. The optical system provides enhanced illumination distributed in a cylindrical beam emanating from the collimating lens. By selectively activating LEDs of the same colors or different color at different times different sequences or patterns may be generated.

23 Claims, 11 Drawing Sheets

MULTICOLOR LED BEACON

This Application is a Continuation-in-Part of U.S. patent application Ser. No. 12/806,284, filed Aug. 9, 2010, now U.S. Pat. No. 8,662,702 which claims priority to U.S. Provisional Application Ser. No. 61/276,115, filed Sep. 8, 2009. Both of these application being incorporated herein by reference.

The present invention relates to LED beacons and particularly, to an LED beacon having two or more LEDs providing light of the same color or of different colors using an improved optical system which may be associated with such LEDs and having a collimating lens and a plurality of condensing, coupling lenses which shift the focus of the collimating lens to the position of the LEDs and distribute the light from the LEDs uniformly on the collimating lens.

Light beacons have been provided with fresnel collimating lenses which provide cylindrical beams from a light source located centrally in the collimating lens. A typical light beacon utilizing cylindrical fresnel collimating lens is shown in U.S. Pat. No. 3,221,162, issued Nov. 30, 1965 to Heenan et al. The distribution of light from a beacon, and the shaping of light from LED sources so as to provide output beams, have also been accomplished utilizing lenses associated with each LED in an LED array. See for example, U.S. Pat. No. 6,425,678, issued Jul. 30, 2002, to Verdes et al. and U.S. Pat. No. 5,237,490, issued Aug. 17, 1993, to Ferng.

Combining lenses which shape the illumination pattern from the LEDs with a fresnel collimating lens having a cylindrical structure surrounding the LEDs and their associated lenses has not as yet been successfully accomplished, particularly when the LEDs are in an array mounted on or around a post to enable heat to be dissipated from the LEDs. One approach has been suggested in U.S. Pat. No. 7,252,405, issued Aug. 7, 2007, to Trenchard et al. There, an array of LEDs mounted on a post is surrounded by a tubular light diffusing member. This light diffusing member distributes the LED light on the fresnel collimating lens. Since the diffusing member does not control distribution of the light, it is not efficient in coupling the light from the LEDs to the collimating lens and reduces the intensity of the beacon. Also, utilizing a diffusing element is not efficient. It has been proposed to use lenses along the optical axis of a pair of LEDs. These lenses merely direct the light emitted from the LEDs radially outwardly to a fresnel collimating lens. They do not move the focus of the collimating lens to the position of the LEDs. The design is limited to opposed LEDs located along a central axis of the beacon, thereby limiting the light output of the beacon to the light which can be provided by only two LEDs. The design of such a two LED system is shown in U.S. Pat. No. 7,534,009, issued May 19, 2009, to Trojanowski et al.

A multi-color warning light is described in U.S. Pat. No. 6,483,439, issued Nov. 19, 2002, to Vukosic et al., and multicolored industrial signal device is described in U.S. Pat. No. 6,626,557, issued Sep. 30, 2003 to Taylor. However, such patents although describing multi-color operation do not describe the improved optics of the present invention, and thereby do not provide the improved performance enabled by such optics.

Accordingly, it is an object of the present invention to provide improved LED beacons.

It is an object of the present invention to provide an improved LED beacons providing illumination in one or more colors and provide such colors selectively and in selected sequences.

It is a further object of the invention to provide a multi-color LED beacon having a plurality of LEDs for emitting light of different colors, which are in different groups of two or more LEDs, where at least one LED in each group being of a different color, and such groups are arrayed along the same level and circumferentially distributed within the beacon about a member or post within an optical system that efficiently couples the light from each LED when activated to a collimating lens surrounding the LED notwithstanding the non-uniform illumination emitted from the LED and the nominal focus of the collimating lens being along an axis shifted radially inwardly from the location of the LED.

It is a still further object of the invention to provide single color and multi-color LED beacons each having an improved optical system including a collimating lens and a condensing, coupling lens between the LED and the collimating lens which provides for relocation of the focus of the collimating lens and enabling collimating lenses of various diameter and height to be used with the same LEDs.

Another object of the invention is to provide single color and multi-color LED beacons having a plurality of LEDs distributed about an axis to efficiently couple the light from the LEDs to collimating optics, such as a fresnel lens formed in a dome, or beam forming optics, such as a rotational or stationary parabolic reflector, using a condensing, coupling lens as adaptor for relocating the focus of, and redistributing the light from the LEDs to, such collimating or beam forming optics, and thereby providing an intense illuminating beacon suitable for use as a warning light.

Briefly described, the present invention enables the use of cylindrical fresnel lenses of the type conventionally used in beacons for collimating the light from a central light source and enables collimating fresnel lenses of different diameters to be used with a plurality of LEDs for emitting light of the same or different colors. To provide a beacon illuminating selectively light in two or more colors, the plurality of LEDs are in different groups of two or more LEDs, where at least one LED (or LED element) in each group can provide light of a different color. Each group of LEDs may represent separate LEDs (or LED emitters of a multi-color LED) and are mounted circumferentially spaced from each other around a central axis, as in a plane perpendicular to the axis (a horizontal plane in the typical installation). The conventional fresnel collimating lens is focused along a central optical axis which is spaced radially inward from the location of the LEDs. A condensing lens arrangement, preferably a meniscus (inside concave and outside convex) lens is used to shift the focus of the collimating lens radially outward from the center to the location of the LEDs. The condensing lens also shapes the light emitted from the LEDs so that it is uniformly distributed over the inside surface of the cylindrical fresnel collimating lens, thereby utilizing efficiently substantially all of the LED illumination, even though the illumination is not uniform from the LED itself.

In a multi-color LED beacon, all or different LEDs of the same color are selectively activated to enable the beacon to emit light of such color. By selectively activating LEDs of the same colors or different colors at different times different sequences or patterns may be generated. Both the light output and the optical efficiency of single color and multi-color LED beacons are enhanced in accordance with the invention.

The present invention in another embodiment provides a rotational or stationary single color and multi-color LED beacon in which beam forming optics of a reflector are provided instead of the collimating fresnel lens described above. The reflector may be a parabolic reflector which can be either stationary, or rotated by a (motor driven) rotator about the internal optical assembly of the LEDs and condensing lens.

Preferably, a multi-color LED beacon is provided having LEDs (or LED emitters) providing light of two different colors, e.g., red and green, or red and blue, which are selectively activated with a programmable controller. LED groups are mounted along the member at the same level in the beacon. along opposite sides of the member facing the optics of a collimating fresnel dome lens, via condensing lenses which focus light of each of the LEDs when activated so as to distribute it over the fresnel lens to provide more uniform illumination than if the condensing lenses were not present. The member may be a post or metallic bar (rectangular or square in cross-section) serving as the heat sink for LED circuit boards or assemblies mounted thereto. The patterns may be continuous or flashing or may be sequential, simulating in different colors, different traveling, moving or rotating patterns of illumination under control of the programmable controller, such a microprocessor or microcontroller.

The foregoing and other objects, features, and advantages of the invention will become more apparent from a reading of the following description in connection with the accompanying drawings wherein.

Figure 2:
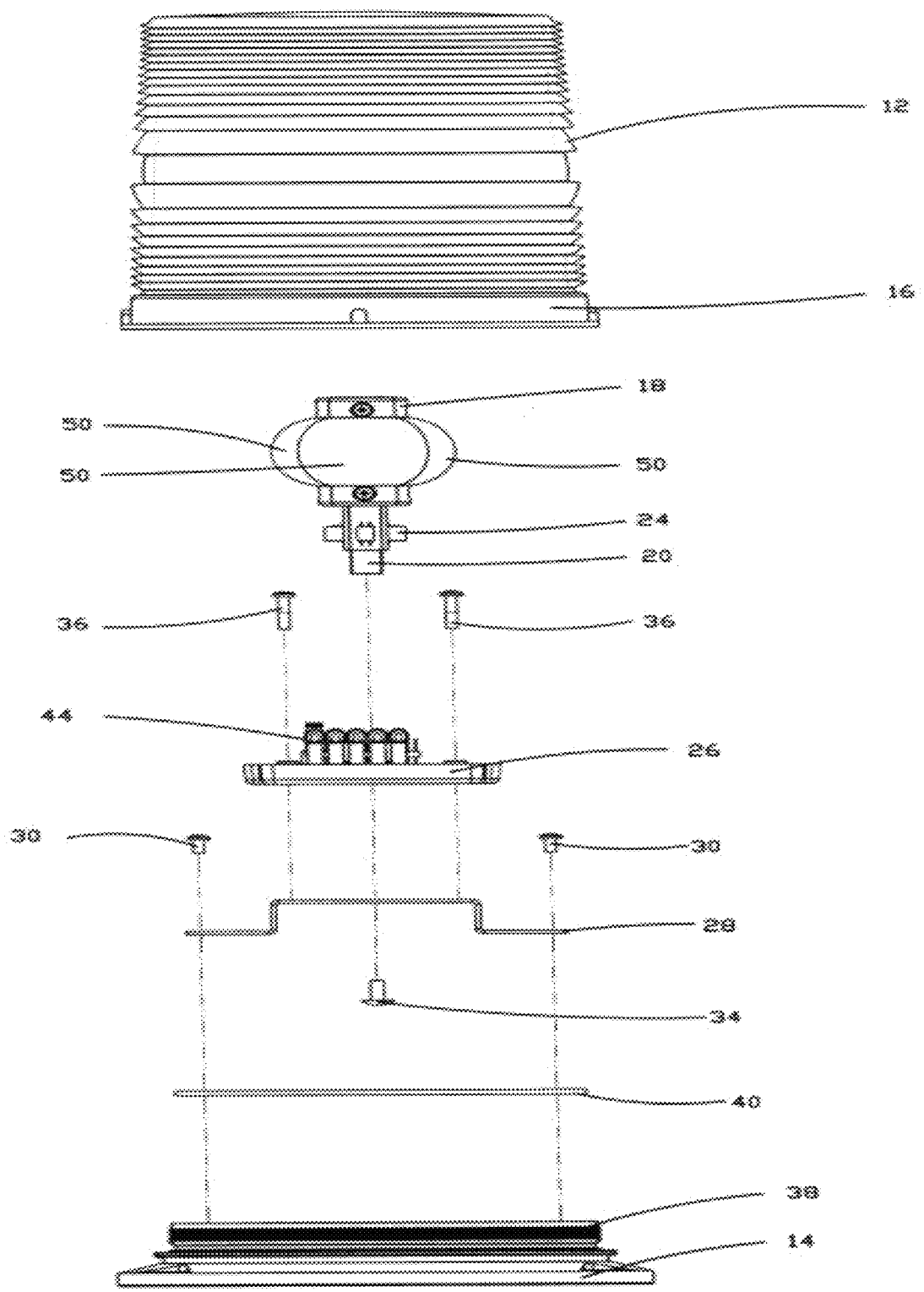
FIG. 2 is an exploded view of the LED beacon shown in FIG. 1.
Figure 4:
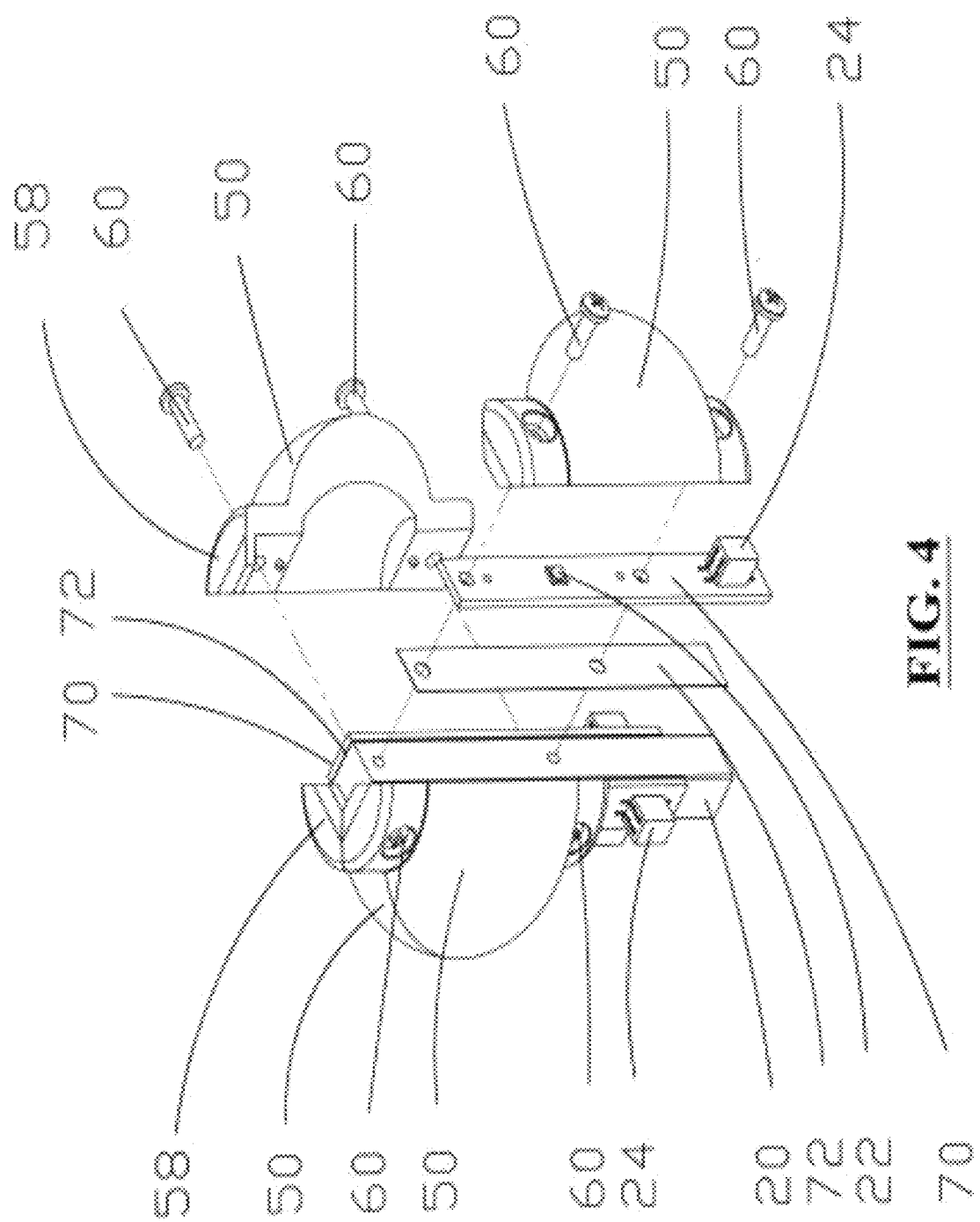
FIG. 4 is an exploded view of the condensing lens system of the beacon shown in FIGS. 1, 2 and 3.
Figure 5A:
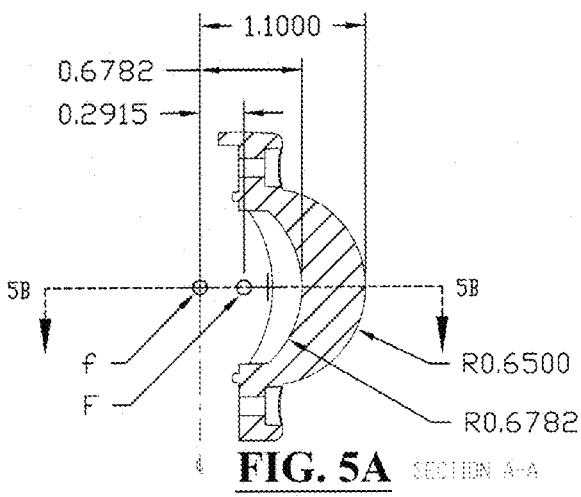
Figure 5F:
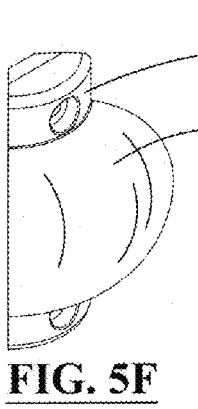
Figure 5B:
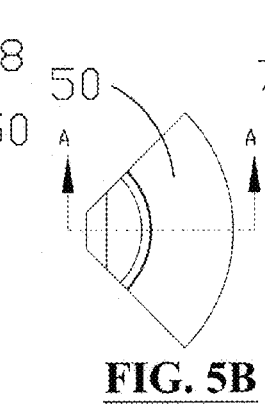
Figure 5E:
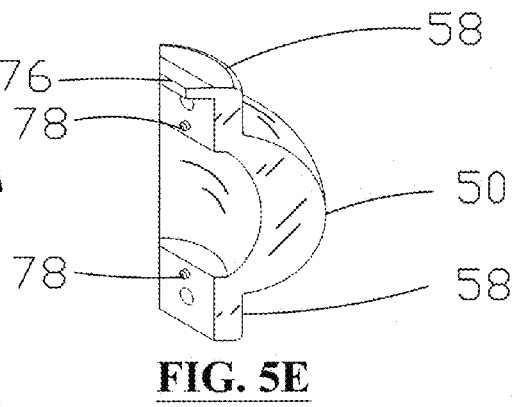
Figure 5C:
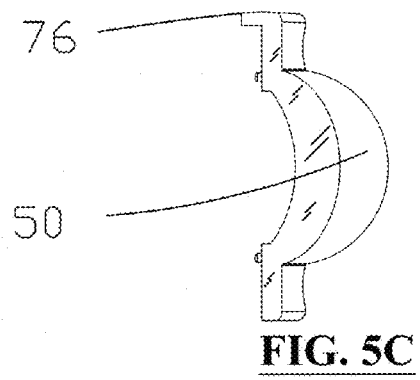
Figure 5D:
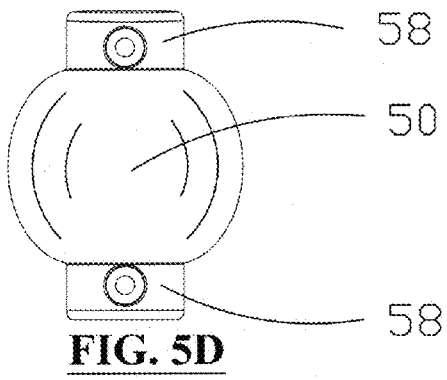
Figure 6:
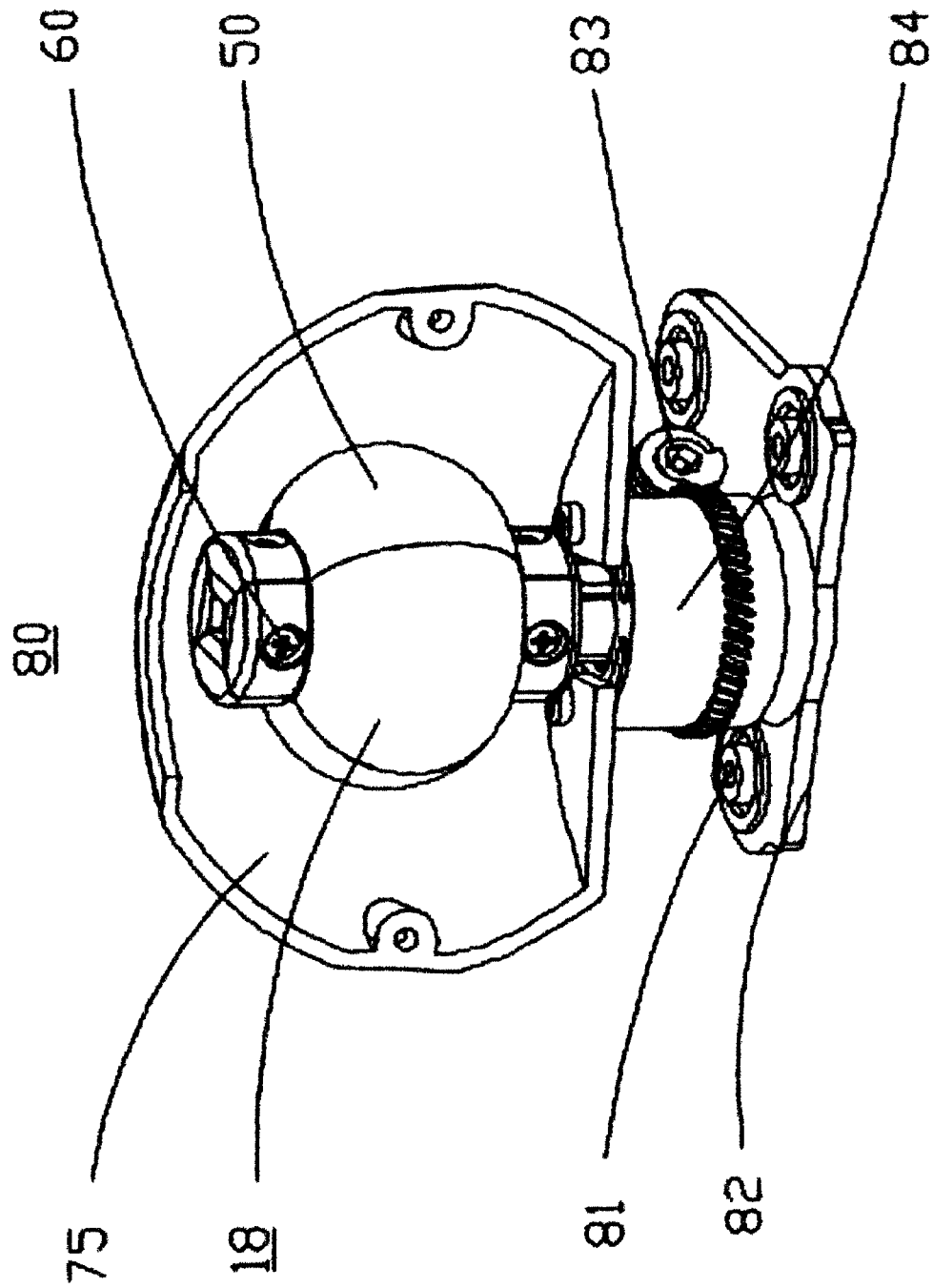
Figure 7:
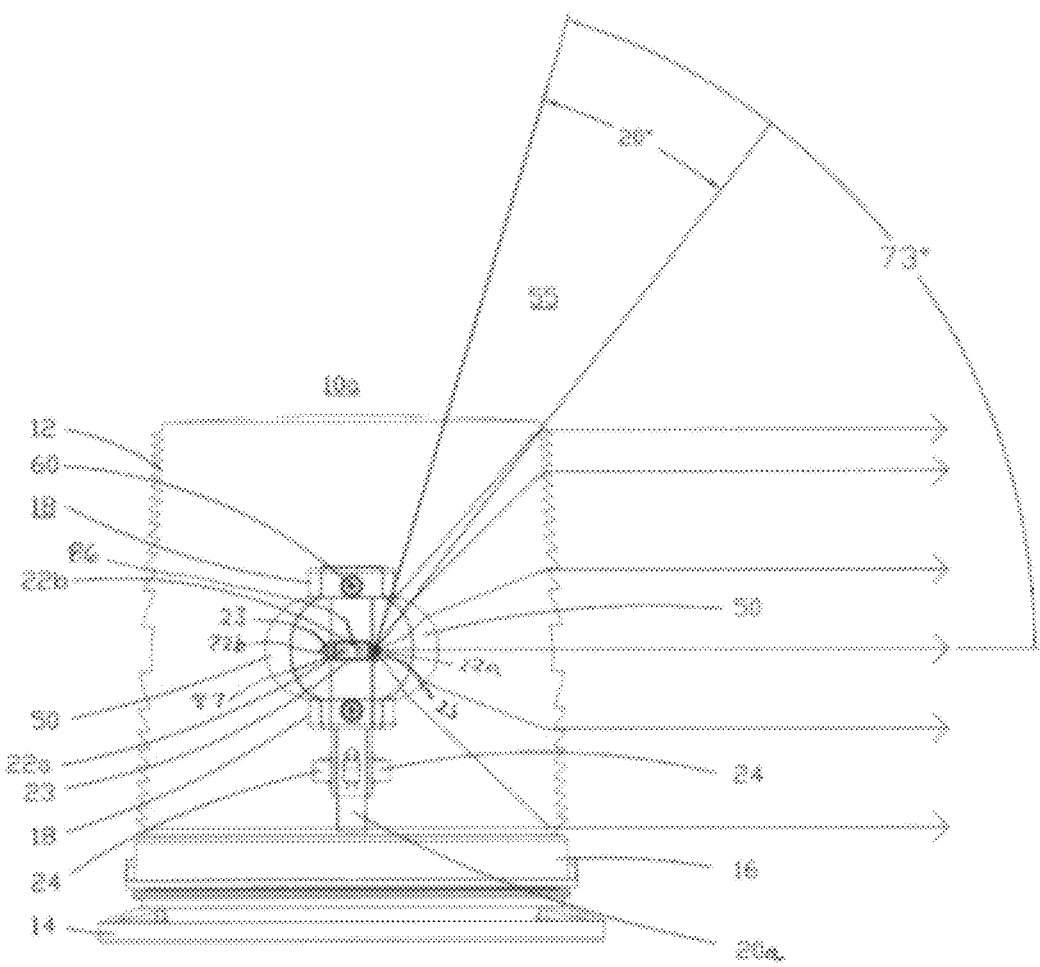
Figure 8:
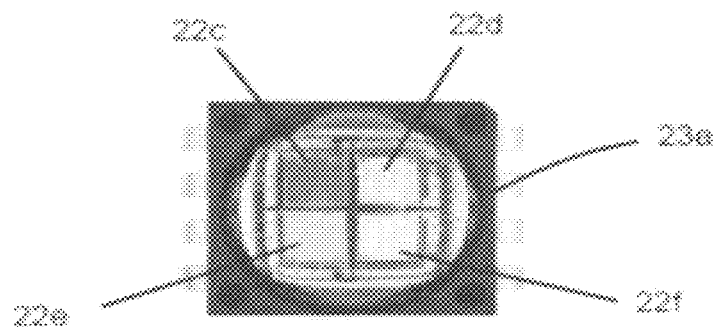
Figure 9:
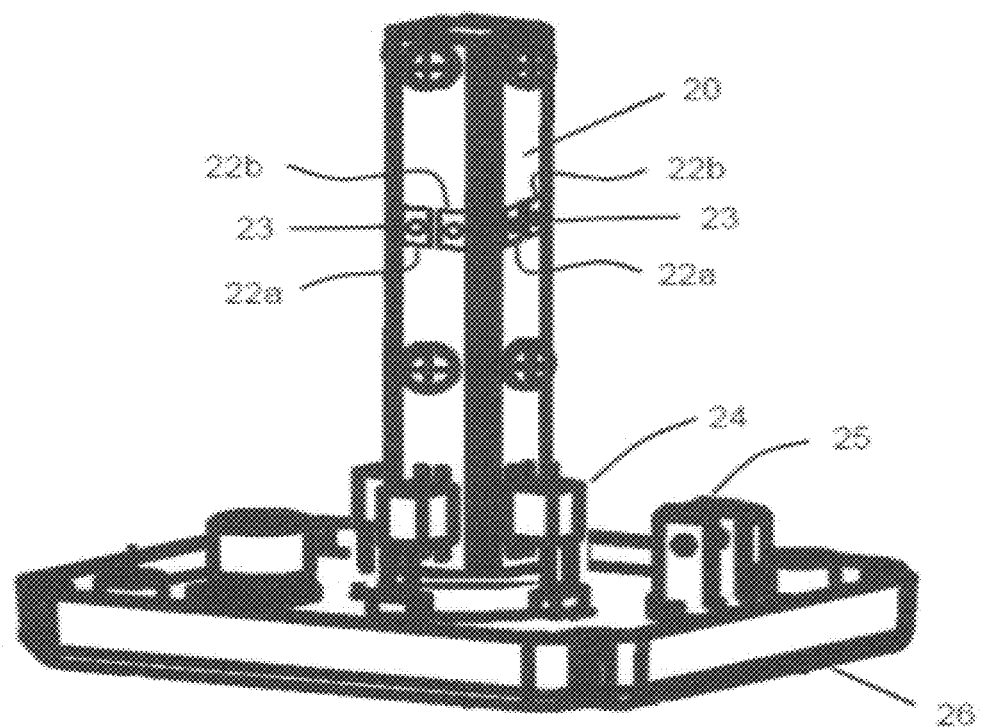
Figure 10:
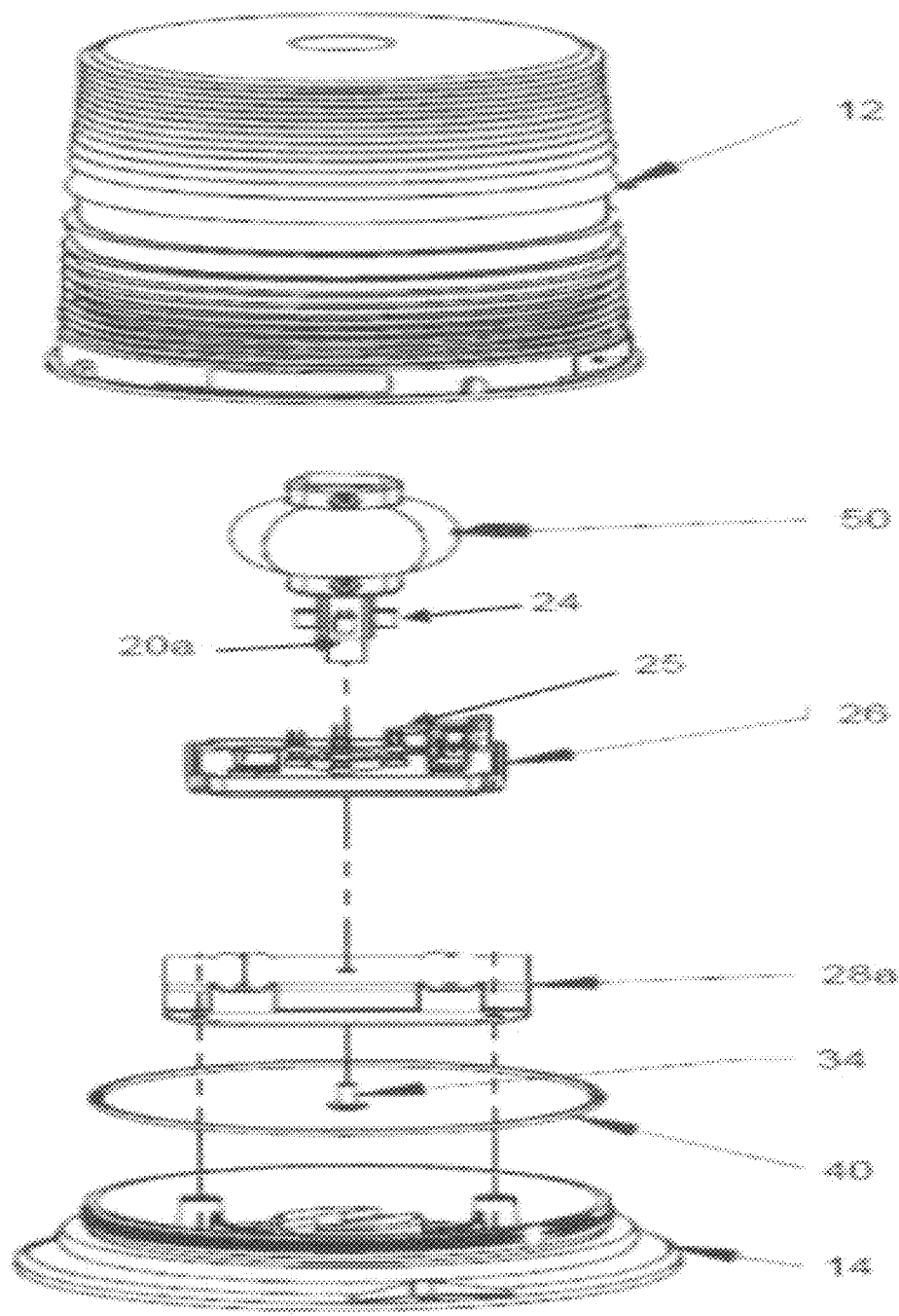
Figure 11A:
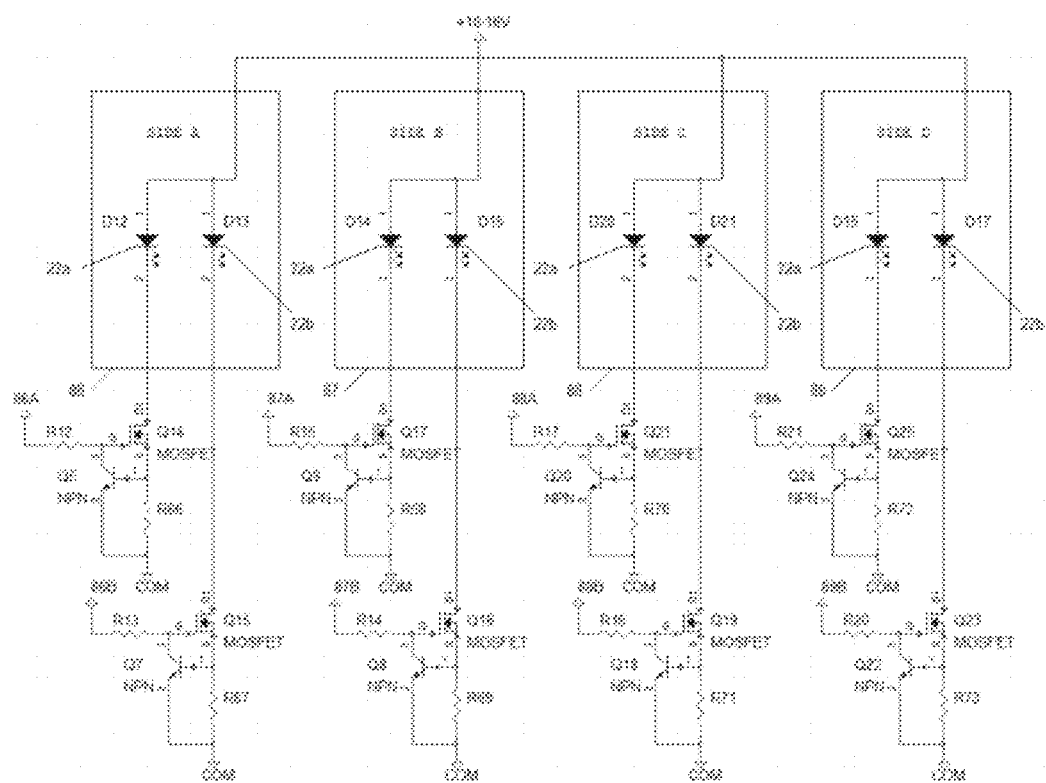
Figure 11B:
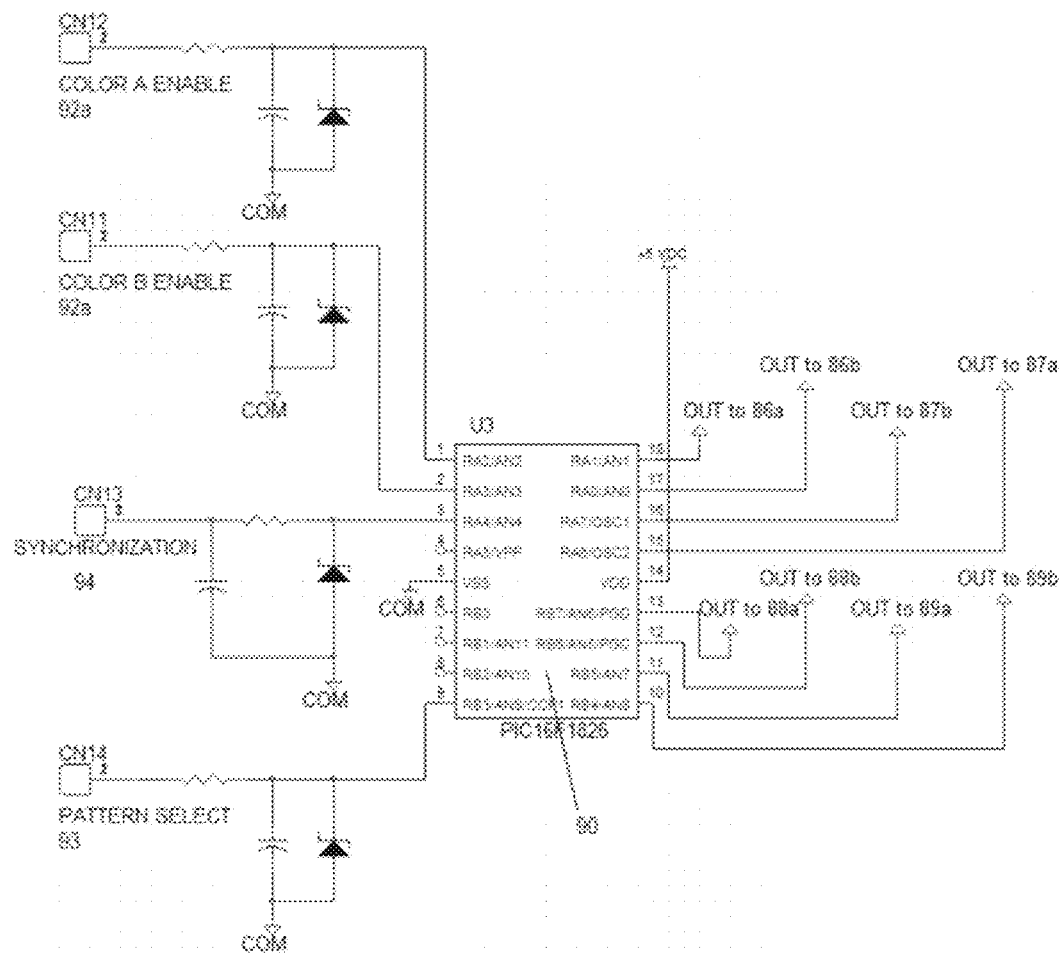

FIG. 5 is a multi-part view consisting of FIGS. 5A-5F of a condensing meniscus, coupling lens in the optical system shown in FIG. 4, wherein FIG. 5A is a sectional view of the lens taken along the line A-A in FIG. 5B; FIG. 5B is a horizontal sectional view through the lens in a horizontal plane through the center of the lens; FIG. 5C is a perspective view of the lens taken from the right as viewed in FIG. 5A; FIG. 5D is an elevational view of the lens looking from the right side of FIG. 5A; FIG. 5E is a perspective view of the lens from the inside thereof; and FIG. 5F is a perspective view of the lens from the outside thereof;

FIG. 6 is a perspective view of an LED beacon of another embodiment of the present invention showing an LED beam beacon;

FIG. 7 is a schematic, elevational view of an LED beacon incorporating the invention for multi-color operation;

FIG. 8 is an example of a multicolor LED having four LED elements in a common module which may be utilized in the LED beacon on FIG. 7;

FIG. 9 is a perspective view of an assembly of the LEDs in the beacon of FIG. 7 apart from the rest of the assembly shown in FIG. 7;

FIG. 10 is an exploded perspective view of an LED beacon of FIG. 7 which is similar to FIG. 2; and FIGS. 11A and 11B are schematic diagram of the electronics of the LED beacon on FIG. 7.

Figure 1:
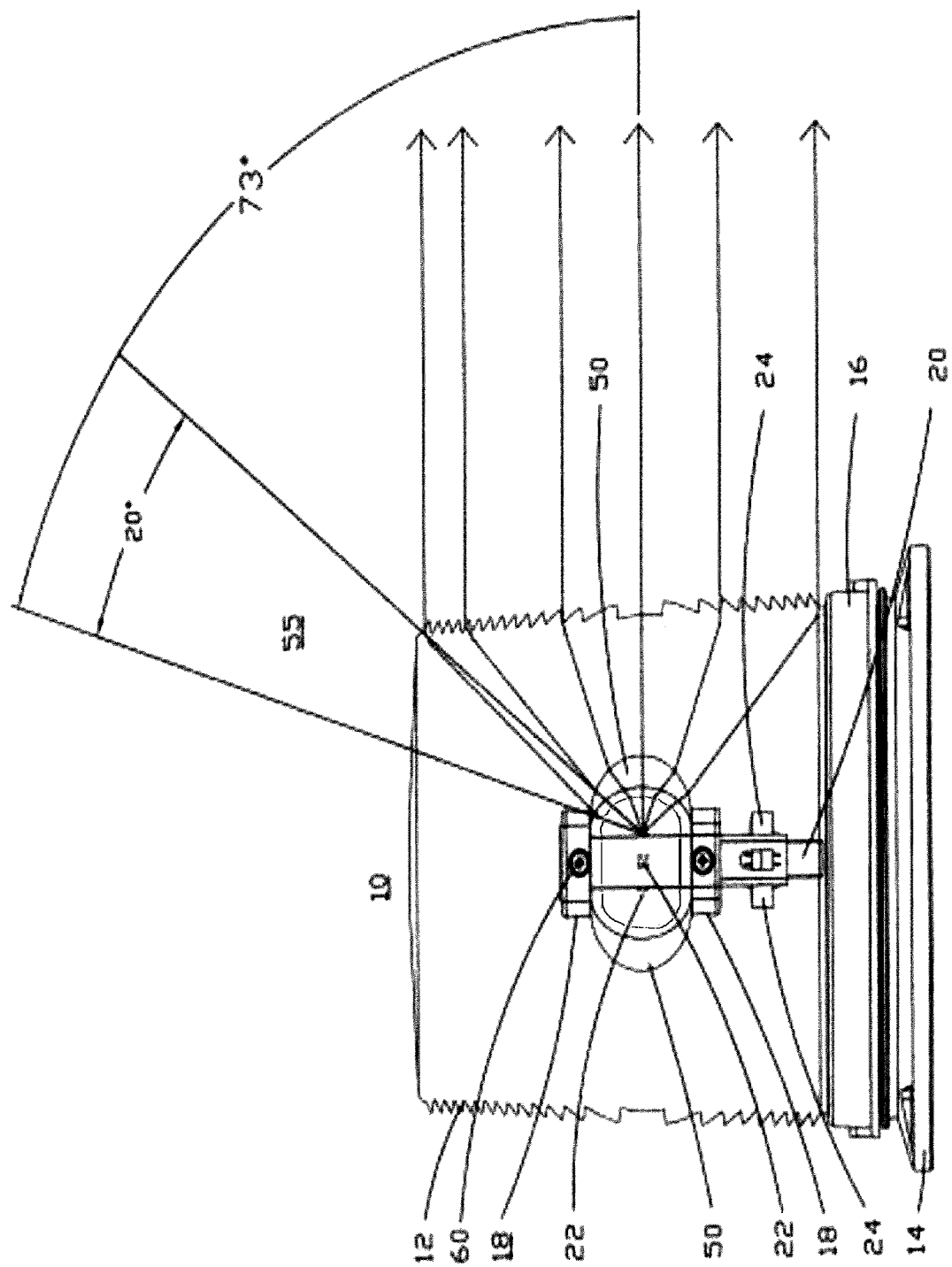
FIG. 1 is a schematic, elevational view of an LED beacon incorporating the invention.
Figure 3:
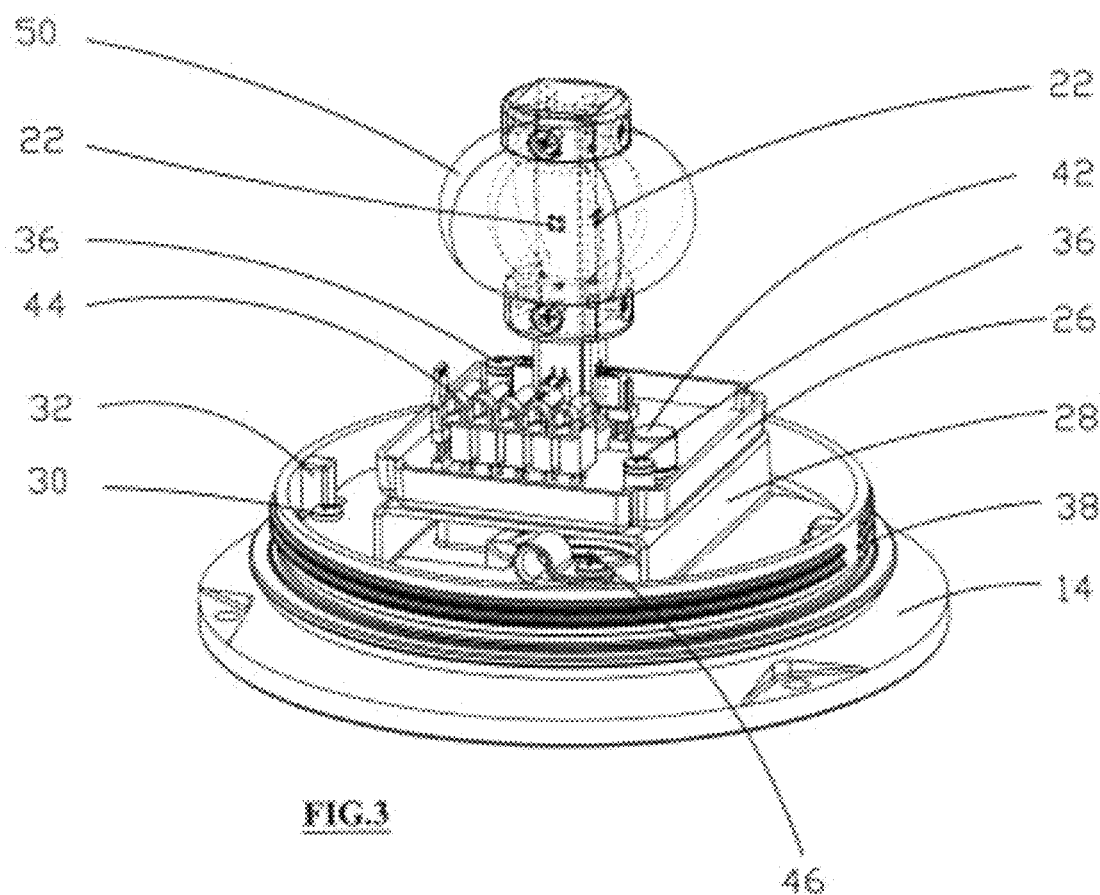
FIG. 3 is a perspective view of the LED beacon shown in FIGS. 1 and 2 with the cap or drum providing a cylindrical fresnel collimating lens not shown in the drawing so as to illustrate the internals of the beacon.

Referring to the drawings, there is shown in FIGS. 1, 2, and 3, an LED beacon 10 having a cylindrical fresnel collimating lens 12 which may be attached to a base 14 via a collar 16. Inside the collimating lens 12 is an LED assembly 18. This assembly 18 has a central post 20 on which is mounted an array of LEDs, e.g., four in number with one on each side of post 20. The post 20 is square in cross-section, and the LEDs are 90° apart. The LEDs 22 are connected via connectors 24 to a circuit board which is potted in a pan 26, as best shown in FIGS. 2 and 3. The pan 26 is mounted on a spacer 28 which is attached by screws 30 to bars 32 projecting radially from the base 14 (see FIG. 3). Another screw 34 attaches the post 20 to the spacer 28 through the pan 26. Other screws 36 attach the pan 26 to the spacer 28. Although the fresnel lens 12 is referred to herein as of a collimating type, depending on the lens 12, the lens 12 may be substantially collimating, or other lens may be used for lens 12 to refract light incident thereto to provide a desired illumination pattern exiting beacon 10.

Screw threads 38 on a cylindrical portion of the base 14 enable the collar 16 of lens 12 to engage base 14, where collar 16 has screw thread along the inner surface of collar 16 which screw onto threads 38 of base 14 thereby attaching the lens 12 to the base 14 and sealing the assembly 18 and the pan 26 and spacer 28. The seal may use an o-ring 40. The lens 12 may be molded plastic material formed into an inverted cup or dome, which may be a desired color. Such inverted cup or dome has a surface defining fresnel lens 12 inside of which LED assembly 18 is located. As shown in FIG. 3, the circuit board has circuit components, such as component 42 which provides circuitry for controlling of, as for example flashing, the LEDs 22. Also connected to the circuit board are connectors 44 which connect wires (not shown). These wires extend outside of the pan 26 and out of the unit through a hole 46 through the base 14. The LED assembly 18 has a plurality of meniscus condensing, coupling lenses 50, one for each of the LEDs 22. The central horizontal plane through which the optical axes of these lenses 50 extend is through the LEDs 22.

The lenses 50 serve two purposes. First, the lenses 50 shift the focus of the fresnel collimating lens 12 (indicated as f, FIG. 5A) to the location of the LEDs 22 (indicated as F in FIG. 5A). Second, as shown in FIG. 1, the condensing lenses 50 also serve the purpose of condensing the illumination emanating from the LEDs 22 so that such illumination covers (paint) the inside of the fresnel collimating lens 12. By virtue of the refraction in the lenses 50, the majority of illumination (approximately ±73° about the horizontal optical axis) from the LEDs 22 is directed to the collimating lens 12 by virtue of the condensing lenses 50. About 20° of the illumination as shown by the area 55 on the upper side of the optical axis is refocused (condensed) into the portion of the illumination which hits the lens 12. Similarly there is another area of about 20° on the lower side of the optical axis which is condensed and hits the lens 12. Thus the radiation pattern of each LED for typical commercially available LEDs such as sold by Cree, or other LED suppliers which would not hit the lens 12 is utilized by virtue of the adapter optics provided by the coupling, condensing lenses 50, thereby enhancing the optical efficienty of the beacon 10. The lenses 50 operate to shift the focus of, and distribute the LED light substantially uniformly to, collimating lens 12 thereby efficiently using light from the array of LEDs 22 on post 20 to provide an intense illuminating beacon 10 suitable for use on emergency vehicles, and for other vehicles and industrial applications for warning beacons.

As shown in FIGS. 4 and 5, the meniscus lenses are in four segments each defining angles of 90° so that when assembled on the post 20, they encompass (external around) the entire post over 360°. The lenses have upper and lower collars 58 which are connected to the post 20 by screws 60. The segments may each be of molded optical material, such as plastic, forming the desired lens shape.

The LEDs 22 and the connectors 24 are on circuit boards 70 to which the LEDs 22 and the connectors 24 are wired. Thermal transfer pads 72 of heat conductive material are sandwiched between the circuit boards 70 and the sides of the post 20 to fill the gap between the boards 70 and the post 20 so as to facilitate the transfer of heat from the LEDs to the ambient via the post. When the segments of the condensing lens 50 are assembled on the post, they are located by flanges 76 on the top thereof and by alignment pins 78 (see FIGS. 5A and 5E). FIG. 5A illustrates the design of an exemplary condensing lens 50. The lens material may be polycarbonate lens material.

The concave inside of the lens 50 has a radius of 0.6782 inches. The outer convex surface has a radius of 0.6500 inches. The thickness of the lens along its optical axis is 1.1 inch and the distance to the LED location, F, is 0.2915 inches. The focus of the collimating lens 12 is shifted from its actual focus at f, to the position of the LEDs at F, by 0.2915 inches with the exemplary lens design, as shown in FIG. 5A.

Thus, an LED beacon 10 having an optical system including a collimating lens 12 and a condensing, coupling lens 50 between the LEDs 22 and the collimating lens 12, which not only provides for relocation of the focus of the collimating lens 12, but also enables collimating lenses 12 of various diameter and height to be used with the same array of LEDs 22.

Referring to FIG. 6, another embodiment of the LED beacon is shown in which instead of using collimating optics of fresnel lens 12, beam forming optics of a collimating (or substantially collimating) reflector 75 is utilized. This reflector 75 may be a parabolic reflector which can be rotated about the internal optical assembly 18 of the LEDs 22, post 20, and adapter optics 50. A rotator mechanism 83, 84 on a base 82, may be attached via grommets 81 to a support structure (not shown, e.g., a vehicle roof, light bar) to provide a rotating LED beam beacon. The rotating reflector mechanism may be of the type in U.S. Pat. No. 5,860,726 issued Jan. 19, 1999, to Richardson, which is herein incorporated by reference. The optical assembly 18 and rotator mechanism 83, 84 may be located internally in a transparent or translucent dome, which may of a desired color.

The reflector 75 may also be stationary, instead of rotatable, by removal of the rotator mechanisms 83, 84 (or non-actuation thereof) to provide a stationary LED beam beacon. The optical assembly 18 may be the same as described earlier. Although four LEDs 22 on post 20 is preferred, optionally a single LED may be used in optical assembly 18 on one side of post 20 to direct light toward the stationary reflector 75 via the adapter optics 50. Accordingly, a parabolic reflector 75 that is stationary or can be rotated about the internal optical assembly 18 is provided, but other beam shaping optics may be used depending on the particular application.

LEDs 22 on post 20 may number four, one on each side of the post 20 in optical assembly 18. However, more than four LEDs 22 may be used, such as eight in number by providing two LEDs 22 on each side of post 20, but other number of LEDs may be used. The LEDs 22 on post 20 may provide light of the same color.

Referring to FIG. 7, a multi-color LED beacon 10a is shown which utilizes the same optics of the condensing lenses 50 and fresnel lens 12 as described above for beacon 10, but different color emitting LEDs are provided to enable beacon 10a to provide illumination in two or more different colors by selectively activating LEDs. The LEDs of beacon 10a are in four different groups 23 each of which have two or more LEDs, where at least one LED in each group 23 is of a different one of the colors to be illuminated by beacon 10a. In the example of FIG. 7, each side of post 20a has a group 23 of two LEDs 22a and 22b mounted thereto, each emitting light of a different color when activated, such as red and blue, respectively. Four different groups 23 of LEDs are thus mounted to post 20a circumferentially spaced from each other around a central axis provided by post 20a.

The LEDs 22a and 22b of each group 23 represent two different LED elements which may be in the same or different packages when mounted to post 20a. For example, one type of group 23 may be a multicolor LED module 23a such as shown in FIG. 8, which can be considered as being four LEDs 22c, 22d, 22e, and 22f each provided by a different LED element (or emitter unit, also known as a die) in module 23a, where LEDs 22c and 22e can provide illumination of one color (e.g., red), and elements 22d and 22f can provide illumination of another color (e.g., blue). LED module 23a shown for example in FIG. 8 is manufactured by Cree, Inc., but other multi-color LED modules may be used. Different groups 23, either provided in a module of two or more LEDs or as separate LEDs, are provided on the fours sides of post 20a at the same level along such post so that the LED elements 22c-f can have their light collected by the condensing lenses 50 and then forwarded to the fresnel lens 12 so as to provide the illumination from the beacon 10a in the patterns which are selected by the programmable microcontroller 90 of FIG. 11B described below.

The four group 23 of LEDs 22a and 22b may on four common circuit boards or assemblies mounted to four sides of post 20a and such circuit boards connect, via connectors 24 on post 20a to a circuit board 25 which is potted in a pan 26, as best shown in FIG. 9. Post 20a may be a metallic bar member attached to the LED circuit boards or assemblies that mount each of groups 23 of LEDs to post 20a. Such bar member may be rectangular or square in cross section.

Referring to FIG. 10, an exploded view of LED beacon 10a providing multicolor illumination is shown having the LED groups 23 mounted on post 20a, such as shown in FIG. 7 or 9 with circuit board 25 and spacer 28a, otherwise the assembly and other elements of FIG. 10 are the same as described earlier and provide the same function. Spacer 28a is used which provides not only the same function as spacer 28 described earlier, but further serves as a heat sink in conjunction with the metallic bar member providing the post 20a, thereby facilitating removal of heat from the LEDs in the operation thereof. If needed, such spacer 28a can be provided when single color LEDs 22 are used.

Referring to FIGS. 11A and 11B, the electronics of the multi-color LED beacon 10b are shown. Such electronics being provided on circuit board 25 (FIG. 11B) which connect to LED circuits (FIG. 11A) for each of the LEDs of beacon 10a. The LED circuits extend within post 20a or along the outside of post 20a to the LEDs along the post 20a, or part of the LED circuit may also be provided on circuit board 25. Each of the four groups 23 of LEDs 22a and 22b is preferably mounted on a different circuit board or assembly 86, 87, 88 and 89 (see e.g., 86 and 87 of FIG. 7) arrayed along the same horizontal level or plane with respect to vertical post 20a, rather than as separate units (see e.g., FIG. 9). Thus, there are a total of eight LED's in beacon 10a of this example, where enable lines 86a, 86b can activate LED 22a and 22b, respectively, of assembly 86, enable lines 87a, 87b can activate LED 22a and 22b, respectively, of assembly 87, enable lines 88a, 88b can activate LED 22a and 22b, respectively, of assembly 88, and enable lines 89a, 89b can activate LED 22a and 22b, respectively, of assembly 89. Each enable line when high (on) switches, via a MOSFET, to drive current to its associated LED, and when the enable line is low (off), the MOSFET disables drive current to its associated LED. In this example, LED beacon 10a can provide dual color illumination in one of two different colors, referred to as Color A by activating LEDs 22a or Color B by activating LEDs 22b, along post 20a.

A microcontroller (or microprocessor) 90 outputs signals along each of enable lines 86a-b, 87a-b, 88a-b, 89a-b, to activate different LEDs associated therewith to enable different patterns of Color A or Color B light to be emitted from beacon 10a. The microcontroller 90 operates in accordance with a program stored in its memory (ROM or RAM) to enable operation of beacon 10a. For example, microcontroller 90 may be a PIC microcontroller as shown in FIG. 11B, but other programmable logic device may be used which can output signals on lines 86a-b, 87a-b, 88a-b, 89a-b, to provide desired a plurality of different illumination patterns of one or more colors associated with LED groups 23.

To enable each Color A and Color B, two inputs 92a and 92b, respectively, are provided to microcontroller 90 to select one of Color A LEDs 22a or Color B LEDs 22b, according to the selected pattern via a pattern select input(s) 93 to the microcontroller 90. By placing on input(s) 93 signals representative of a one of different values, addresses, codes, or instructions, detectable by the microcontroller 90, one of multiple different patterns of illumination may be selected utilizing light of Color A or Color B, or both, responsive to inputs 92a and/or 92b are high (enabled) or low (disabled). The present invention is not limited to any particular means for pattern input selection to microcontroller or programmable logic device 90.

If the signal on pattern select input 93 is detected by microcontroller 90 for operating LED beacon 10a in a flash mode, then either Color A LEDs 22a are periodically activated via output along their enable lines 86a, 87a, 88a, and 89a at a preselected flash rate, or Color B LEDs 22b are periodically activated via output along their enable lines 86b, 87b, 88b, and 89b. For example, in Color A flash mode, Color A input 92a is high (enabled), and Color B input 92b is low (disable), and microcontroller 90 then alternates outputting an activate (enable) signal on all four LED enable lines 86a, 87a, 88a, and 89a simultaneously to illuminate Color A LEDs 22a in each of assemblies 86-89, and the disabling all four LED enable lines 86a, 87a, 88a, and 89a simultaneously to turn off Color A LEDs 22b. Color B is not illuminated from beacon 10a. In Color B flash mode, Color B input 92b is high (enable), and Color A input 92a is low (disable), and microcontroller 90 then alternates outputting an activate (enable) signal on all four LED enable lines 86b, 87b, 88b, and 89b simultaneously to illuminate Color B LEDs 22b in each of groups 86-89, and the disabling all four LED enable lines 86b, 87b, 88b, and 89b simultaneously to turn off the Color B LEDs 22b. Color A is not illuminate from beacon 10a. The rate of flash is preset in memory of microcontroller 90, such as every 0.5 second. In Color A and B flash mode, both Color A and Color B inputs 92a and 92b are high (enabled) and beacon 10a then alternates between flashing in Color A and B, but only one color is emitted on at any one time. Thus, microcontroller 90 alternates between outputting enable signals on LED enable lines 86a, 87a, 88a, and 89a, while disabling LED enable lines 86b, 87b, 88b, and 89b, and then enable signals on LED enable lines 86b, 87b, 88b, and 89b, while disabling LED enable lines 86a, 87a, 88a, and 89a. The flashing rate is in accordance with a preset on and off intervals stored in memory of the microcontroller 90. A clock in the microcontroller 90 is used to measure each of the flash intervals.

If the signal on pattern select input 93 is detected by microcontroller 90 for operative LED beacon 10a in rotating mode, the LEDs 22a or 22b along each of assemblies 86-89 are sequentially activated by microcontroller 90 so that the light from beacon 10a is in a traveling, moving, or rotating pattern. For example, if Color A input 92a is high (enabled), and Color B input 92b is low (disabled), then the microcontroller 90 sequentially activates only one of enable lines 86a, 87a, 88a, and 89a at a time around post 22a to simulate a traveling, moving, or rotating light about 360 degrees of beacon 10a, and all of the Color B LEDs 22b are off. The below table shows the timing for sequentially activation LEDs 22a of circuit boards 86-89, where X indicates when an enable line is active and thus the LED associated with the enable line is illuminating light there from.

| | Time in Seconds | | | | | | | |
|---|---|---|---|---|---|---|---|---|
| Microcontroller Output | 0.5 | 1.0 | 1.5 | 2.0 | 2.5 | 3.0 | 3.5 | 4.0 |
| Output to Enable Line 86a | X | | | | X | | | |
| Output to Enable Line 87a | | X | | | | X | | |
| Output to Enable Line 88a | | | X | | | | X | |
| Output to Enable Line 89a | | | | X | | | | X |

Similarly, if Color B input 92b is high (enabled), and Color A input 92a is low (disabled), then the microcontroller 90 sequentially activates only one of enable lines 86b, 87b, 88b, and 89b at a time around post 22a, and all of the Color A LEDs 22a are off. If Color A enable and Color B inputs 92a and 92b are both high, then microcontroller 90 sequentially activates only one of enable lines 86a, 87a, 88a, and 89a, 86b, 87b, 88b, and 89b at a time around post 22a so that the beacon alternates between rotating Color A and Color B. A different pattern may also be selected in which microcontroller 90 flash the same color multiple times in a quick sequence prior to alternating to the other color. The time intervals of the above table are exemplary, and other time intervals may be used as stored in memory of microcontroller 90.

Other or different patterns can be provided by separately enabling or simultaneous enabling each LED element 22a and 22b on each post 20a, as desired, by programming microcontroller 90. For example, faster flash rates or more attention getting flash "bursts" may be selectable in one or both color outputs order to emphasize higher level of warning. Further, the LEDs 22a or 22b in beacon 10a may be activated to operate in a continuous mode in the Color A or B, respectively.

A synchronization line 94 is provided which when switched from high to low, microcontroller 90 reset the cycle of its internal clock. Such is useful when two different LED beacons 10a need to be synchronized to each other so that they flash at the same time. A user interface (keypad, buttons, or switches) may be provided to enable/disable Color A and B inputs 92a and 92b, respectively, and to select different ones of patterns along pattern select input 93. Inputs 92a, 92b, 93, and 94 may also interfaced to another computer system, controller, or device to externally control beacon 10a operation.

The present invention broadly relates to use of an adapter optic (the condensing coupling lenses 50) in a horizontal array with horizontal LED's 22 or LED groups 23 (or 23a) along vertical post 20 or 20a so as to obtain the full benefits of LED illumination vs. conventional incandescent, halogen or strobe illumination. The collimating, fresnel lenses do not have to be redesigned to accommodate LED illumination. Existing domes providing collimating lens for the beacon, and tooling for producing the domes may be used thereby reducing development effort and financial cost in providing an LED beacon 10 and 10a. The adapter optics enables increase of the light output significantly over prior LED designs even where no optics internal of the dome or outside lens is used. As with LED beacon 10 described in FIG. 6, rotating reflector 75 may also be used in the LED beacon 10a instead of using collimating optics of fresnel lens 12.

From the foregoing description, it will be apparent that there has been provided an improved LED beacons for single color or multi-color operation. Variations and modifications in the herein described LED beacons within the scope of the invention will undoubtedly suggest themselves to those skilled in the art. Accordingly, the foregoing description should be taken as illustrative and not in a limiting sense.

The invention claimed is:

1. A multi-color LED beacon comprising:
   a central member;
   a plurality of LEDs for emitting different colors of light, in which said plurality of LEDs are in different groups of two or more LEDs, at least one LED in each group being of a different color, and said groups of LEDs are mounted circumferentially spaced from each other around a central axis provided by said central member; and
   an optical system within which said central member is disposed to enable each of the LEDs when activated to project light there from through the optical system out of said beacon.

2. The LED beacon according to claim 1 further comprises means for activating said LEDs to emit said light in selected patterns of said different colors.

3. The LED beacon according to claim 2 wherein said selected patterns include flashing in the same color, flashing in said different colors, and sequentially to simulate traveling, moving or rotating illumination.

4. The LED beacon according to claim 1 wherein said optical system comprises a collimating lens around said central member and a plurality of condensing lenses between said central member and said collimating lens for shifting the focus of said collimating lens to each of said groups of LEDs for focusing illumination from one or more of said LED groups over said collimating lens.

5. The LED beacon according to claim 4 wherein said collimating lens is a fresnel dome lens and said plurality of condensing lenses is an assembly each comprising a meniscus lens.

6. The LED beacon according to claim 1 wherein each group of LEDs is a multi-color LED having multiple LED elements.

7. The LED beacon according to claim 1 wherein each group of LEDs are separate LED elements.

8. The LED beacon according to claim 1 wherein said member when vertically oriented each of said groups of said LEDs are located on a different side of said member at the same horizontal level along said member.

9. An LED beacon comprising:
   a plurality of LEDs at least two or which provide light of different colors;
   first optics;
   second optics between said LEDs and said first optics, wherein said second optics changes the illumination pattern from each of said LEDs when actuated so that substantially all of the illumination from the LED is incident said first optics; and
   wherein said second optics is a lens which shifts the focus of said first optics to the position of each of the LEDs of said plurality of LEDs.

10. The LED beacon according to claim 9 wherein said first optics is one of a reflector or collimating optics.

11. The LED beacon according to claim 9 wherein said first optics is a rotatable or stationary reflector about the LEDs.

12. The LED beacon according to claim 9 wherein said LEDs are part of an array of LEDs and is in an assembly including at least said second optics.

13. The LED beacon according to claim 1 wherein at least two of said groups of LEDs are mounted on opposite sides of said central member.

14. The LED beacon according to claim 9 wherein said second optics is a lens which condenses the illumination from the LEDs.

15. The LED beacon according to claim 9 wherein said first optics is a collimating reflector.

16. The LED beacon according to claim 15 wherein said reflector rotates around the LEDs and said second optics.

17. The LED beacon according to claim 16 wherein said first optics is a dome having a surface defining a fresnel lens inside of which said LEDs and second optics are located.

18. An LED beacon comprising:
   different color LED elements operable to provide illumination;
   a collimating lens surrounding said LEDs;
   a condensing, coupling lens for optically coupling said LED elements and the collimating lens, said coupling lens being operative to shift the focus of the collimating lens to the position of said LED elements along an optical axis extending through the collimating lens and said coupling lens; and
   wherein said coupling lens changing the illumination from said LED elements so that the radiation pattern of said illumination is condensed to cover the collimating lens.

19. The LED beacon according to claim 18 wherein said collimating lens is a fresnel cylindrical lens.

20. The LED beacon according to claim 18 wherein said condensing coupling lens is a meniscus lens.

21. The LED beacon according to claim 18 wherein said LED elements represent one of a plurality of groups of said LED elements provided as part of an assembly on a post, and a plurality of coupling lenses are provided one for each of said groups of LED elements, each of said coupling lenses being a meniscus lens which is a segment around approximately 90° of said post.

22. The LED beacon according to claim 18 wherein said collimating lens is substantially collimating.

23. A method for efficiently coupling illumination produced by different color LED elements providing illumination onto optics of a stationary or rotating illumination beacon comprising the steps of providing at least two LED elements of different color, and providing a condensing lens between said LED elements and said optics of said beacon to shape the illumination from said LED elements to enable substantially all of said illumination from said LED elements to be incident said optics of the beacon, and to shift the focus of said optics of said beacon to be incident with said LED elements.

* * * * *